(12) United States Patent
Zhang et al.

(10) Patent No.: US 11,908,096 B2
(45) Date of Patent: Feb. 20, 2024

(54) STEREOSCOPIC IMAGE ACQUISITION METHOD, ELECTRONIC DEVICE AND STORAGE MEDIUM

(71) Applicant: Beijing Xiaomi Mobile Software Co., Ltd., Beijing (CN)

(72) Inventors: Yangyang Zhang, Beijing (CN); Zixuan Huang, Beijing (CN); Shuangshuang Yin, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 198 days.

(21) Appl. No.: 17/565,746

(22) Filed: Dec. 30, 2021

(65) Prior Publication Data
US 2022/0351478 A1 Nov. 3, 2022

(30) Foreign Application Priority Data

Apr. 29, 2021 (CN) .......................... 202110473235.2

(51) Int. Cl.
| | |
|---|---|
| G06T 19/20 | (2011.01) |
| G06T 15/20 | (2011.01) |
| G06T 5/00 | (2006.01) |
| G06T 7/50 | (2017.01) |
| H04N 13/128 | (2018.01) |

(Continued)

(52) U.S. Cl.
CPC .............. *G06T 19/20* (2013.01); *G06T 5/005* (2013.01); *G06T 7/50* (2017.01); *G06T 15/20* (2013.01); *G06T 7/543* (2017.01); *G06T 17/00* (2013.01); *G06T 2207/10024* (2013.01); *G06T 2207/10028* (2013.01); *G06T 2207/20072* (2013.01);

(Continued)

(58) Field of Classification Search
CPC .......... G06T 19/20; G06T 5/005; G06T 7/50; G06T 15/20; G06T 2207/10024; G06T 2219/2012; G06T 2207/10028; G06T 2207/20072; G06T 17/00; G06T 17/10; G06T 7/543; H04N 13/128; H04N 13/279
See application file for complete search history.

(56) References Cited

U.S. PATENT DOCUMENTS

| | | | |
|---|---|---|---|
| 9,013,482 B2 | 4/2015 | Lim et al. | |
| 2007/0237420 A1* | 10/2007 | Steedly | G06V 10/24 382/284 |

(Continued)

OTHER PUBLICATIONS

Chen et al., "CN107578389A—The method that the image color depth information collaboration of plane supervision is repaired", 2017, , Sun Yat Sen University (Year: 2017).*

(Continued)

*Primary Examiner* — YuJang Tswei
(74) *Attorney, Agent, or Firm* — Volpe Koenig

(57) ABSTRACT

A stereoscopic image acquisition method includes acquiring a first three-dimensional model corresponding to a two-dimensional image according to the two-dimensional image and a depth image; acquiring a target area and an area to be repaired corresponding to the first three-dimensional model; obtaining a second three-dimensional model by repairing a pixel in the area to be repaired according to a color value and a depth value of a pixel in the target area; and acquiring a stereoscopic image to be displayed according to a preset viewing angle change path and the second three-dimensional model.

18 Claims, 8 Drawing Sheets

(51) Int. Cl.
*H04N 13/279* (2018.01)
*G06T 17/00* (2006.01)
*G06T 7/543* (2017.01)

(52) U.S. Cl.
CPC .... *G06T 2219/2012* (2013.01); *H04N 13/128* (2018.05); *H04N 13/279* (2018.05)

(56) References Cited

U.S. PATENT DOCUMENTS

| | | | | |
|---|---|---|---|---|
| 2011/0254841 | A1* | 10/2011 | Lim | G06T 17/20 345/421 |
| 2013/0011045 | A1* | 1/2013 | Lee | G06T 3/40 382/154 |
| 2015/0125093 | A1* | 5/2015 | Jeong | G06T 5/005 382/284 |
| 2017/0064305 | A1* | 3/2017 | Fu | G06T 7/70 |
| 2019/0087726 | A1* | 3/2019 | Greenblatt | G06N 3/08 |
| 2020/0334894 | A1* | 10/2020 | Long | G06T 13/00 |
| 2021/0137634 | A1* | 5/2021 | Lang | A61B 90/13 |

OTHER PUBLICATIONS

Frueh et al., Data Processing Algorithms for Generating Textured 3D Building Facade Meshes from Laser Scans and Camera Images, 200410, Springer Science (Year: 2004).*

Meuleman et al., Real-Time Sphere Sweeping Stereo From Multiview Fisheye Images CVPR, 2021 (Year: 2021).*

He et al., Real-Time 3D Reconstruction of Thin Surface Based on Laser Line Scanner, 20200118, MDPI (Year: 2020).*

Wiles et al., SynSin End-to-End View Synthesis From a Single Image CVPR 2020 (Year: 2020).*

Han et al—KR20030043637A—2002—Korean Patent Office (Year: 2002).*

Tang Danhang et al., "Latent Regression Forest: Structured Estimation of 3D Hand Poses", IEEE Transactions on Pattern Analysis and Machine Intelligence, IEEE Computer Society, USA, vol. 39, No. 7, Jul. 1, 2017, pp. 1374-1387, XP011651269, ISSN: 0162-8828, DOI:10.1109/TPAMI.2016.2599170.

Saponaro Philip et al., "Reconstruction of: textureless regions using structure from motion and image-based interpolation", 2014 IEEE International Conference on Image Processing (ICIP), IEEE, Oct. 27, 2014, pp. 1847-1851, XP032966911, DOI: 10.1109/ICIP.2014.7025370.

Extended European Search Report dated May 11, 2023 for European Patent Application No. 21218162.2.

Hedman, P. K., "Instant 3D photography", ACM Transactions on Graphics (2018).

Shih M L, "3D Photography using Context-aware Layered Depth Inpainting", IEEE/CVF Conference on Computer Vision and Pattern Recognition (2020).

Danhang, T. "Latent Regression Forest: Structured Estimation of 3D Hand Poses", IEEE Transactions on Pattern Analysis and Machine Intelligence, IEEE Computer Society, USA (2017).

Partial European Search Report dated Jan. 3, 2023 for European Patent Application No. 21218162.2.

* cited by examiner

STEREOSCOPIC IMAGE ACQUISITION METHOD, ELECTRONIC DEVICE AND STORAGE MEDIUM

CROSS REFERENCE TO RELATED APPLICATIONS

The present application is based on and claims priority of the Chinese Patent Application No. 202110473235.2, filed on Apr. 29, 2021, the entire content of which is incorporated herein by reference for all purposes.

BACKGROUND

An existing electronic device is usually provided with a plurality of cameras, which are used to take photographs in different dimensions, and then obtain a 3D effect image. When the 3D effect image is acquired, depth estimation and repairing of an occluded area are performed in the related art usually by using a deep learning network. Since different electronic devices have different hardware and software resources, parameters of the deep learning network need to be adjusted according to the hardware and software resources, or the application of the deep learning network to the electronic devices is limited due to the demands for the hardware and software resources.

SUMMARY

According to a first aspect in an example of the disclosure, provided is a stereoscopic image acquisition method, including:
  acquiring a first three-dimensional model corresponding to a two-dimensional image according to the two-dimensional image and a depth image;
  determining a target area and an area to be repaired corresponding to the first three-dimensional model, the area to be repaired referring to an area that is occluded by a foreground object and needs to be displayed in the case of a viewing angle being changed, and the target area referring to an area that provides a color value and a depth value for the area to be repaired;
  obtaining a second three-dimensional model by repairing a pixel in the area to be repaired according to the color value and the depth value of a pixel in the target area; and
  acquiring a stereoscopic image to be displayed according to a preset viewing angle change path and the second three-dimensional model.

According to a second aspect in an example of the disclosure, provided is an electronic device, including:
  a processor; and
  a memory used for storing a computer program executable by the processor.

The processor is configured to execute the computer program in the memory to implement the above-mentioned method.

According to a third aspect in an example of the disclosure, provided is a non-transitory computer-readable storage medium. When an executable computer program in the storage medium is executed by a processor, the above-mentioned method is implemented.

Understandably, the above general description and the following detailed description are merely examples and illustrative, and do not limit the disclosure.

BRIEF DESCRIPTION OF THE DRAWINGS

The accompanying drawings herein are incorporated into and constitute a part of the description, and illustrate examples consistent with the disclosure, and are used together with the description to explain the principles of the disclosure.

FIG. 6 shows a schematic diagram of an effect of acquiring a target area and an area to be repaired according to an example, in which FIG. 6A shows a sub-graph of an initial depth layer, FIG. 6B shows a foreground depth edge and a background depth edge, FIG. 6C shows a texture area and an occlusion area, and FIG. 6D shows an inpainted depth layer;

DETAILED DESCRIPTION

Some examples will be illustrated in detail herein, and the examples are shown in the figures. When the following description refers to the figures, the same numerals in different figures represent the same or similar elements unless otherwise indicated. The examples described in the following description do not represent all examples consistent with the disclosure. Instead, they are merely apparatus examples consistent with some aspects of the disclosure as detailed in the appended claims.

Figure 1:
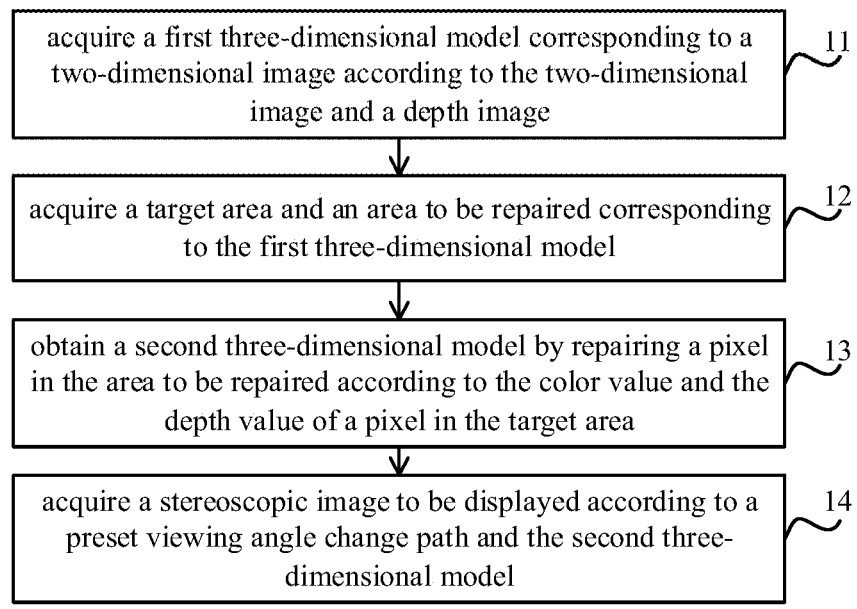
FIG. 1 shows a flow chart of a stereoscopic image acquisition method according to an example.
Figure 2:
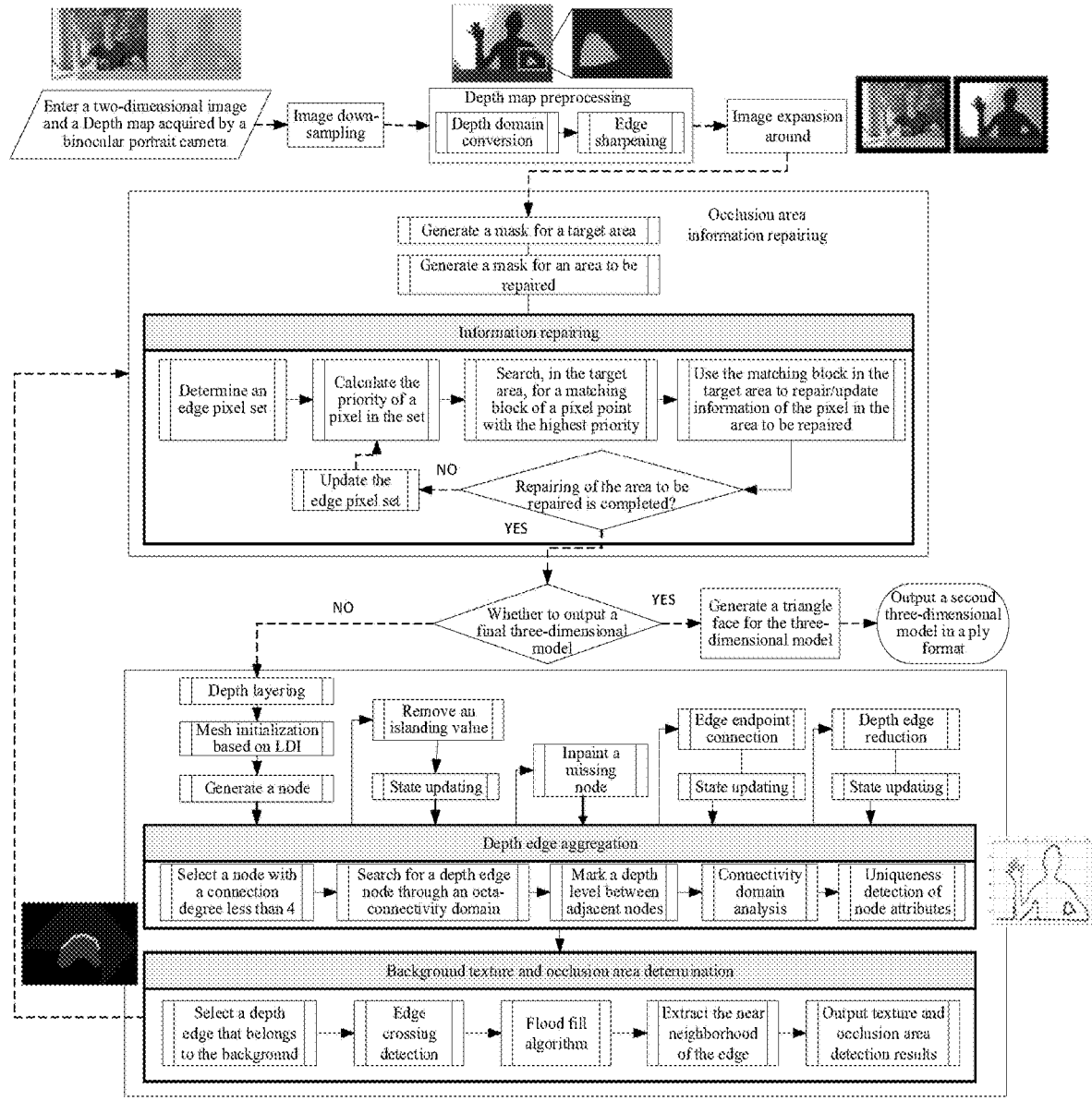
FIG. 2 shows a flow chart of another stereoscopic image acquisition method according to an example.

In order to solve the technical problem existing in the related art, an example of the disclosure provides a stereoscopic image acquisition method, which can be applied to an electronic device, such as a smart phone, a personal computer, tablet computer and a server, especially a mobile device. FIG. 1 shows a flow chart of a stereoscopic image acquisition method according to an example of the disclosure. FIG. 2 shows a flow chart of another stereoscopic image acquisition method according to an example of the disclosure. Referring to FIG. 1 and FIG. 2, a stereoscopic image acquisition method includes steps 11-14.

In step 11, a first three-dimensional model corresponding to a two-dimensional image is acquired according to the two-dimensional image and a depth image.

In this example, a camera module may be provided in an electronic device. After the camera module is started, the camera module may work according to a preset working mode or a previous working mode. For example, the working mode may include a photographing mode or a portrait mode. The photographing mode refers to a mode to obtain an original image, and the portrait mode refers to a mode to obtain a blurred image of the portrait.

In this case, a touch-control screen or a control button in the electronic device may detect a user's trigger operation in real time or periodically, and send an operation signal to a processor when the user's trigger operation is detected. After receiving the operation signal, the processor may parse the operation signal and generate a corresponding control signal for sending to the camera module. After receiving the control signal, the camera module may take a photograph in response to the control signal, and send an obtained two-dimensional image (such as an RGB image or a grayscale image) to the processor or store the two-dimensional image in a designated position (such as a local memory, a cloud end, an external memory communicably connected to the electronic device).

In this example, the electronic device may acquire a depth image that matches the above-mentioned two-dimensional image. For example, the above-mentioned camera module may include a depth camera, and the depth camera may obtain a depth image in the same scene while obtaining the two-dimensional image. For another example, the above-mentioned camera module may include two cameras, and calibration data of the two cameras are stored in the electronic device. For example, the calibration data may include data such as the positions of the cameras, the distance between the cameras and a camera projection model. The processor may use the calibration data to calculate the depth value of each pixel in the captured image, then obtain a depth image that matches the two-dimensional image.

Notably, the above-mentioned solution for acquiring a two-dimensional image and a depth image by using a camera in real time may be applied when photographing a scene. For example, a stereoscopic photographing option may be preset in the electronic device. After the option is triggered, the electronic device may take a real-time photograph and generate a two-dimensional image, and then generate a stereoscopic image on the basis of the two-dimensional image and the depth image.

In another example, the electronic device may further read a previously photographed two-dimensional image and depth image from a designated position, which can also implement the solution of the disclosure. For example, an image rendering option can be preset in the electronic device. After the option is triggered, the electronic device may generate a stereoscopic image from the two-dimensional image selected by the user and the matched depth image, and then display the stereoscopic image and store the stereoscopic image in a specified position.

Figure 3:
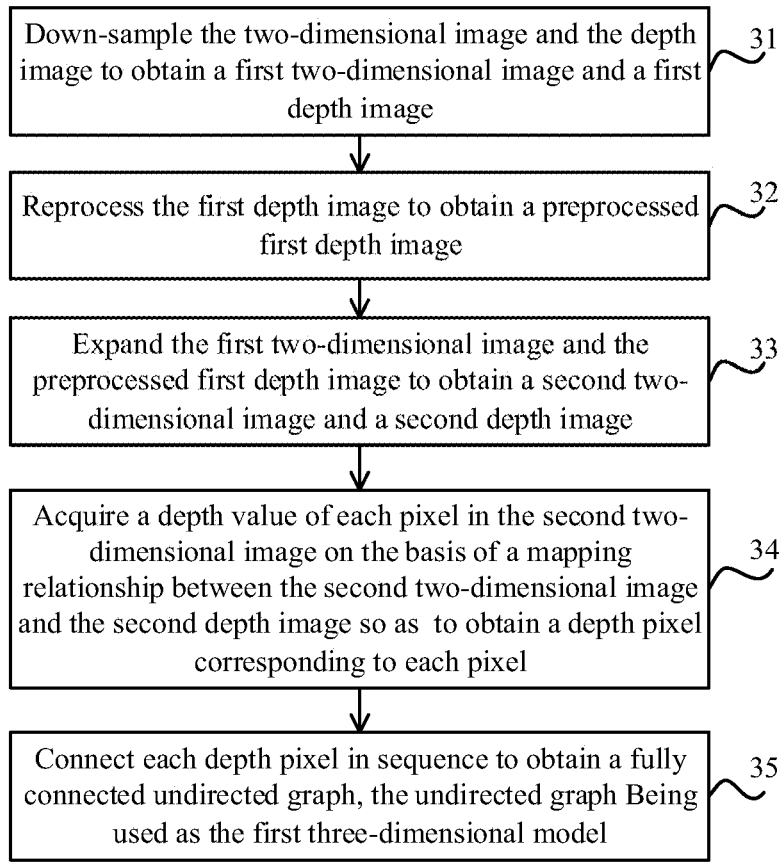
FIG. 3 shows a schematic diagram for acquiring a first three-dimensional model according to an example.

In this example, according to the depth image and the two-dimensional image, the electronic device may obtain a three-dimensional model, which is referred to as a first three-dimensional model hereinafter. Referring to FIG. 3, steps 31-35 are included.

In step 31, the electronic device may down-sample the two-dimensional image to obtain a down-sampled two-dimensional image, which is referred to as a first two-dimensional image hereinafter. At the same time, the depth image may be down-sampled to obtain a down-sampled depth image, which is referred to as a first depth image hereinafter. In this step, by down-sampling the two-dimensional image and the depth image, the amount of data for subsequent calculations may be reduced, which is suitable for scenes where the computing resources of the electronic device are limited. The image processing work may be completed in the shortest time while ensuring the normal operation of the electronic device. Considering that with the development of science and technology, in the case that the computing resources of the electronic device are sufficient, there is no need to down-sample the image, that is, the step 31 is not a necessary step.

In step 32, the electronic device may preprocess the first depth image. The preprocessing may include, but is not limited to, depth domain conversion and edge sharpening, etc., and a preprocessed first depth image may be obtained. Taking the preprocessing including depth domain conversion as an example, conversion from a depth domain [0, 255] to a depth domain [0, 10] may reduce the number of depth levels at the edge of the depth image, and solve or alleviate the problem of depth pixels or subsequent depth edges being divided into a plurality of depth layers due to depth gradients, which is beneficial to improving the accuracy of acquiring the depth edges in subsequent steps. Taking edge sharpening as an example, the noise in the depth image may be filtered out, and the details or textures in the depth image may be highlighted, which is beneficial to acquiring features such as depth edges in the subsequent steps, and improving the accuracy of acquiring the features. It should be understood that the preprocessing on the first depth image may be set according to a specific scene. On the basis of being beneficial to improving the performance of the method, corresponding solutions fall into the solutions of the disclosure.

In step 33, the electronic device may expand the first two-dimensional image, that is, add pixels around the first two-dimensional image, so as to obtain a second two-dimensional image of a preset size; furthermore, the same expansion method is used to expand the preprocessed first depth image to obtain a second depth image. It should be understood that the second two-dimensional image and the second depth image have the same scale and resolution, that is, the pixels in the two have a one-to-one corresponding relationship. In this step, the size of the image may be increased by expanding the image, so as to ensure that there is sufficient image information in the case that the subsequent viewing angle is changed, that is, in the case that the field of view (FOV) of a camera becomes larger.

In step 34, on the basis of a mapping relationship between the second two-dimensional image and the second depth image, the electronic device may acquire a depth value of each pixel in the second two-dimensional image to obtain a depth pixel corresponding to each pixel.

In step 35, the electronic device may connect each depth pixel in sequence to obtain a fully connected undirected graph, and use the undirected graph as the first three-dimensional model.

Figure 4:
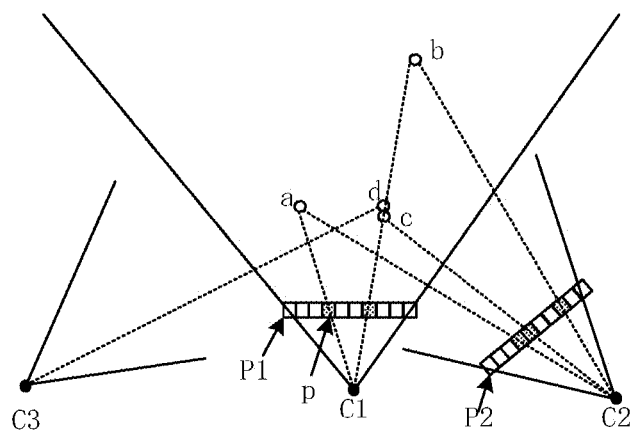
FIG. 4 shows a schematic diagram of a layered depth image according to an example.

It should be understood that each pixel in the two-dimensional image may be represented by two-dimensional coordinates (x, y), and each node in the first three-dimensional model may be represented by three-dimensional coordinates (x, y, z). The coordinate z in the three-dimensional coordinates represents a depth value. The representation of the first three-dimensional model may include one of a volume pixel, a point cloud and a triangle mesh. In one example, in the case that a triangle mesh with the characteristics of light weight and rich shape details is used for representation, that is, an undirected graph data structure is used to describe the triangle mesh in this example, pixels (hereinafter referred to as depth pixels) with depth information are regarded as nodes of the undirected graph, and the depth pixels belonging to the same depth layer are connected by edges. Referring to FIG. 4, cameras C1, C2 and C3 may each take a photograph to obtain a single view, that is, a two-dimensional image, such as a single view P1 photographed by the camera C1. On the basis of the definition of Layered Depth Images (LDI), each pixel on a single view is regarded as a light ray. In a real scene, there are multiple depth-layer objects (i.e., depth pixels a, b, c and d) in the direction of the light ray. The depth pixels a, b, c and d are connected with edges to obtain a fully connected undirected graph, that is, the triangular graph in this example is an initialized fully connected undirected graph. It should be understood that the depth pixel a and a pixel p on the single view P1 are on the same light ray, so the depth pixel a may be imaged at the pixel p of the camera C1, and the pixel p of the single view P1 is represented in gray.

Referring to FIG. 1, in step 12, a target area and an area to be repaired corresponding to the first three-dimensional model, are acquired. The area to be repaired refers to an area that is occluded by a foreground object and needs to be displayed in the case that a viewing angle is changed, and the target area refers to an area that provides a color value and a depth value for the area to be repaired.

Figure 5:
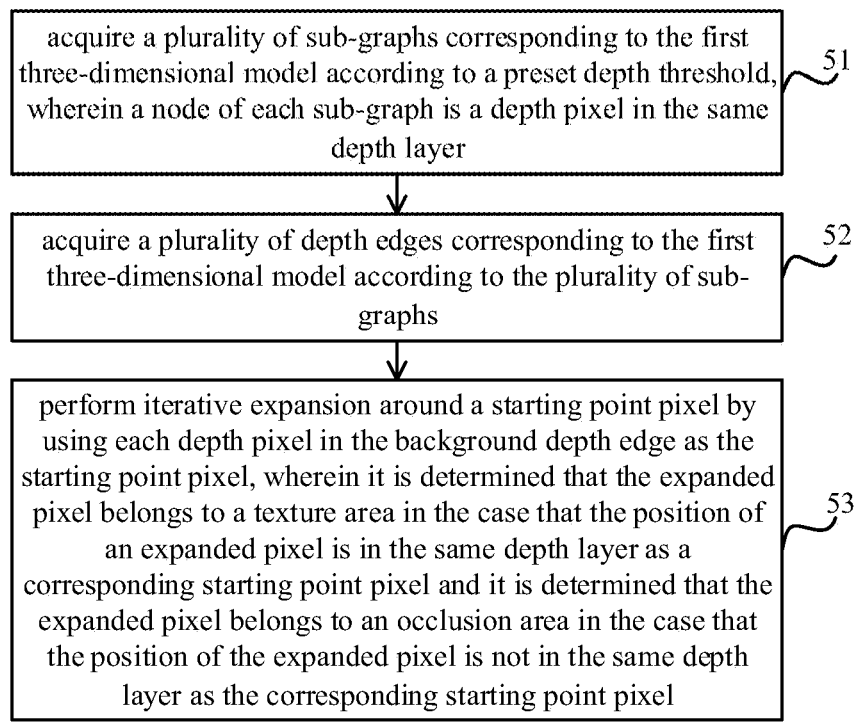
FIG. 5 shows a flow chart for acquiring a target area and an area to be repaired according to an example.

In this example, the electronic device may obtain the target area and the area to be repaired, which correspond to the first three-dimensional model. Referring to FIG. 5, steps 51-53 are included.

In step 51, the electronic device may acquire a plurality of sub-graphs corresponding to the first three-dimensional model according to a preset depth threshold. A node of each sub-graph is a depth pixel in the same depth layer. In this step, the preset depth threshold may be stored in the electronic device in advance, and the depth threshold may be set according to a specific scene. For example, in the case that the depth domain is [0,10] in step 32 (shown in FIG. 3), the depth threshold may be set to 0.5, 1.5, 2.5, 3.5, 4.5, 5.5, 6.5, 7.5, 8.5 and 9.5; and then, the depth layer of the depth pixel is determined by means of rounding. Taking the depth value of a depth pixel being 5.3 as an example, the depth value is less than the depth threshold 5.5, and then the depth pixel may be divided into a depth layer 5. Taking the depth value of a depth pixel being 5.6 as an example, the depth value is greater than the depth threshold 5.5, and then the depth pixel may be divided into a depth layer 6. After dividing each depth pixel into each depth layer, a sub-graph representing each depth layer may be obtained. In this step, a plurality of sub-graphs corresponding to the first three-dimensional model may be obtained. A node of each sub-graph is a depth pixel in the same depth layer.

Considering that the number of nodes of each sub-graph is different, if the number of nodes is too small, it may be noise. In an example, the electronic device may filter the sub-graphs. The electronic device may acquire the number of depth pixels in each sub-graph, and delete the sub-graph with the number less than or equal to a preset number. The preset number may be adjusted according to a specific scene, such as according to image clarity or according to other parameters, for example, the preset number can be 20. In this way, by deleting the sub-graphs with too few nodes in this example, the number of sub-graphs may be reduced and some noise may be eliminated, which is beneficial to reducing the amount of data processing and improving the processing efficiency of the electronic device.

In step 52 (shown in FIG. 5), the electronic device may acquire a plurality of depth edges corresponding to the first three-dimensional model according to the plurality of sub-graphs. The plurality of depth edges include a background depth edge, and the background depth edge refers to a depth edge in which each depth pixel belongs to a background.

In this example, for each sub-graph in the plurality of sub-graphs, the electronic device may obtain a degree of each node in each sub-graph. The degree refers to the number of connecting edges between the node and other nodes, and there is one connecting edge between the node and a node in the same depth layer; and each node in each sub-graph is a depth pixel corresponding to each node in the first three-dimensional model. The reason is as follows: in the case that a node in the sub-graph is in the same depth layer up, down, left and right in the two-dimensional image, the node has 4 connecting edges, that is, the degree is 4; and in the case that the degree is less than 4, it means that the node is at the edge position of the depth layer. Then, the electronic device may acquire a plurality of depth edge node aggregations on the basis of a node having an octa-connectivity domain direction aggregation degree less than a preset degree threshold. The depth edge node aggregation refers to a set of depth pixels located at the edge of the same depth layer. That is, by means of the connectivity domain analysis in this step, the depth edge node aggregation representing each depth layer may be extracted. Then, the electronic device may perform uniqueness detection on a node in each depth edge node aggregation, i.e., comparing the depth value of the node with a preset depth value. The node having the depth value less than the preset depth value belongs to a foreground pixel, and the node having the depth value greater than or equal to the preset depth value belongs to a background pixel. Thus, it can be determined whether each node belongs to the background pixel or the foreground pixel. In this way, a plurality of depth edges corresponding to the first three-dimensional model may be obtained.

The preset depth value may be set according to an empirical value. For example, in a portrait mode, the position of a person is usually 1-3 meters away from a camera, then the preset depth value may be set to 3 meters, and after the depth domain conversion, the above-mentioned 3 meters may be converted correspondingly, such as conversion to 3 in the depth domain [0, 10]. Alternatively, the preset depth value may be set according to a statistical value. For example, the distribution of the depth values of all pixels in a two-dimensional image can be counted. The depth values of the pixels corresponding to a human body account for more, and the depth values of the pixels in a space between the human body and the background account for less. The depth value or the depth value average value of the depth pixels at the connecting position between the human body and the space may be used as the preset depth value, and the preset depth value is converted to a corresponding depth domain. A skilled person may select an appropriate preset depth value according to a specific scene, and if the foreground or background can be distinguished, the corresponding solution falls within the protection scope of the disclosure.

Considering that sub-graphs may be deleted in the above-mentioned example, the depth edges of the areas corresponding to the sub-graphs are in a closed state, or some isolated small island areas, i.e., islanding areas. The depth value of the islanding areas may not be very accurate due to the influence of noise, etc., which will result in poorer effect of the subsequent triangle graph and increased processing time of the algorithm. Thus, in an example, the electronic device may acquire at least one closed depth edge to be processed among the plurality of depth edges.

For example, the electronic device may firstly determine the closed edge, and the depth pixel inside the closed edge has no depth value. Alternatively, the depth value is random and does not have a uniform depth layer, then the closed edge can be determined as the depth edge to be processed. Then, the electronic device may acquire the length of each depth edge in the neighborhood of each depth edge to be processed, and obtain the longest depth edge corresponding to each depth edge to be processed. Then, the electronic device may combine each depth edge to be processed into the depth layer of the corresponding longest depth edge.

Combination refers to updating the depth value of each depth pixel in the depth edge to be processed, to the depth value of the depth pixel in the longest depth edge, such as the average value of the pixel depth values in the longest depth edge or the depth value after iterative updating. The updated depth value refers to a calculated average value of the depth values of one or more depth pixels in the neighborhood of the depth pixels to be combined, and the average value is used as the depth value of the depth pixels to be combined.

In this way, in this example, by combining the depth edges of the islanding areas, some noise that may be caused by deleting sub-graphs may be eliminated, and the accuracy of subsequent acquisition of the depth edges can be ensured. It should be understood that the above-mentioned process of combining sub-graphs to be processed is an iterative process until all the depth edges to be processed are combined.

After combining the islanding areas into the depth layer of the longest depth edge, the nodes in the first three-dimensional model may be less than those in the two-dimensional image. The two-dimensional image may include the original two-dimensional image or the above-mentioned first two-dimensional image, which is determined according to whether step 31 is provided in the above-mentioned example. Hereinafter, the solution of each example is described with step 31 provided as an example. At the same time, the electronic device may compare each pixel in the down-sampled two-dimensional image (i.e., the first two-dimensional image) with each node in the first three-dimensional model. Since the first two-dimensional image is a two-dimensional image, a pixel of the first two-dimensional image includes two-dimensional coordinates (x, y), and a node in the first three-dimensional model includes three-dimensional coordinates (x, y, z). At the same time, a pixel that does not contain (x, y) in the first three-dimensional model and a pixel that does not contain the z value in the two-dimensional image can be determined by means of coordinate comparison, that is, a missing node in the first three-dimensional model is obtained. In the first three-dimensional model, the electronic device may inpaint a missing node in the first three-dimensional model in the case that the missing node corresponding to each pixel in the down-sampled two-dimensional image in the first three-dimensional model is determined. A depth value of the missing node is an average depth value of depth pixels in the longest depth edge nearby.

Considering the existence of depth noise, among the plurality of depth edges obtained in the above example, there may be incorrect nodes at the end points of some depth edges. In other words, theoretically, the end point of the depth edge has only one connecting edge, and in 4 neighborhoods of the depth edge, there is at least one end point of the depth edge of another depth layer. To this end, the electronic device in this example may acquire the end point of each depth edge, and determine whether each end point has only one connecting edge and its neighborhood includes at least one end point of the depth edge of another depth layer. In the case that the end point has only one connecting edge and its neighborhood includes at least one end point of the depth edge of another depth layer, the electronic device may determine the end point to be the end point of the corresponding depth edge; and in the case that the end point has only one connecting edge and its neighborhood does not include an end point of the depth edge of another depth layer, the end point is connected to the other depth edge closest to it. In this way, the depth noise may be eliminated in this example, and the accuracy of the obtained depth edges may be improved.

Considering the use of depth edges to acquire an occlusion area in subsequent examples, many redundant values are present in the above-mentioned plurality of depth edges, especially where the depth edges that may belong to the same depth layer are divided into multiples, or where multiple intermediate depth layers are divided from the foreground depth layer to the background depth layer, thus leading to an increase in the number of depth edges and excessive consumption of the resources in the electronic device, and further affecting the performance of the electronic device. To this end, in this example, the electronic device may acquire the number of depth pixels included in each depth edge, and in the case that the number is less than a preset pixel threshold, such as 20 pixels, the depth edge may be deleted at the same time. In this way, by deleting some depth edges, the electronic device may improve the processing efficiency without affecting the accuracy of subsequent acquisition of the occlusion area.

It should be noted that in the case that an example includes at least one iteration of steps of deleting sub-graphs, inpainting missing nodes, processing the end points of depth edges, and deleting some depth edges, each iteration is part of an iterative process. After each iteration is completed, the attributes of the nodes in the first three-dimensional model are updated. It should be understood that due to the changes in the depth values of some nodes in the first three-dimensional model, the depth pixels at the edges also change. Thus, it is necessary to re-acquire the depth edge node aggregations of the first three-dimensional model and re-acquire a plurality of depth edges corresponding to the first three-dimensional model.

In step 53, for each depth pixel in the background depth edge, the electronic device may perform iterative expansion around a starting point pixel by using each depth pixel as the starting point pixel. If the position of an expanded pixel has a depth pixel located in the same depth layer as a corresponding starting point pixel, it is determined that the depth pixel belongs to a texture area; and if the position of the expanded pixel does not have a depth pixel located in the same depth layer as the corresponding starting point pixel, it is determined that the depth pixel belongs to an occlusion area. The electronic device may use the texture area as the target area corresponding to the first three-dimensional model, and use the occlusion area as the area to be repaired corresponding to the first three-dimensional model.

It should be noted that the target area refers to an area where the color value and the depth value of a pixel are known, and the area to be repaired refers to an area where the color value and the depth value of a pixel are unknown. In other words, the area to be repaired is an area containing a pixel to be repaired, and the target area is the source of the color value and the depth value in the case that the area to be repaired is repaired.

Figure 6:
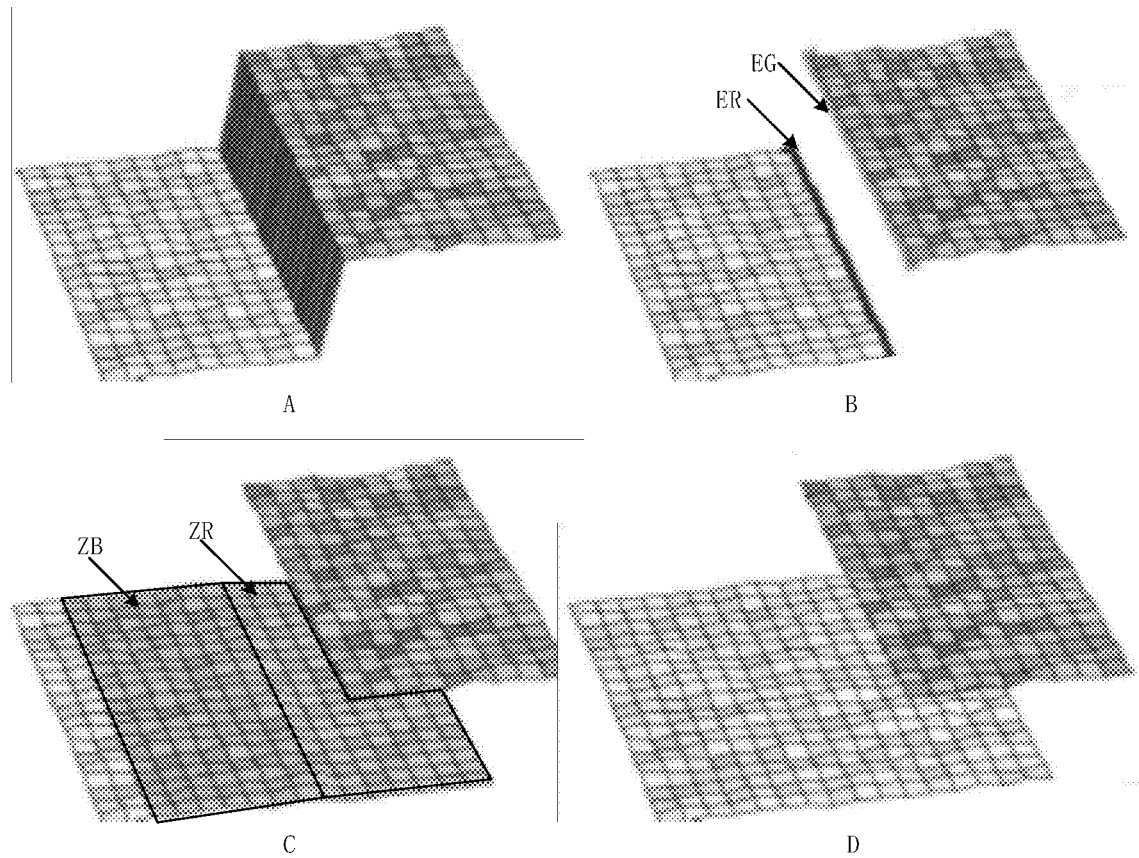

In this example, referring to FIG. 6, the electronic device may acquire a layered depth image corresponding to the first three-dimensional model, and the effect is shown in FIG. 6A. The electronic device may obtain a plurality of depth edges; these depth edges include the depth edge corresponding to the foreground depth layer and the depth edge of the background depth layer, and the effect is shown as EG and ER in FIG. 6B. Then, the occluded area is mainly the depth layer where the depth edge ER is located. Then, the electronic device may perform cross detection on the background depth edge ER. If there is a cross, it means that the background depth layer is an extended depth layer, and constraints need to be added. In this example, on the basis that each depth pixel in the background depth edge ER is used as a starting point pixel, the electronic device may perform iterative expansion around the starting point pixel by using a flood fill algorithm. If the position of an expanded pixel is at the same depth layer, the corresponding node on the pixel belongs to the texture area, i.e., the target area, and the effect is shown as a ZB area in FIG. 6C. Conversely, if there is no corresponding node at the same depth layer, it belongs to the occlusion area, i.e., the area to be repaired, and the effect is shown as a ZR area in FIG. 6C. Finally, the missing nodes are inpainted to obtain FIG. 6D.

It should be noted that in this example, iterative expansion is not unlimited in four directions in the flood fill algorithm. In order to reduce the consumption in the electronic device, in this example, considering the shape of a depth edge to restrict the expansion direction, the normal vector direction of the depth edge is firstly used as the reference direction, and the normal vector is parallel to the depth layer where the depth edge is located. Then, nodes are expanded in the 4 directions (up, down, left and right) of the depth edge node (in the plane), and iterated in turn until the set size is reached. The set size may be set according to the specific scene, such as the depth edge is expanded outward by 20-40 pixels.

It should be noted that in this example, considering that the boundary area between the texture area and the extended area is the neighborhood of the depth edge, it is difficult to determine whether it is the foreground or the background. Thus, in this example, the depth pixels within the preset size of the depth edge may be acquired as the neighborhood.

It should be noted that in this example, in step 52, the acquired depth edges may be separately stored as a graph. In the subsequent process, only the data of this graph will be processed until the Region of Interest (ROI) of the graph is obtained. At the same time, a pattern of the target area and the area to be repaired is obtained. After positioning the pattern on the first two-dimensional image, the area covered by the pattern can be used as the target area and the area to be repaired. In this way, the electronic device may reduce the amount of data processing and improve processing efficiency. In step 13 (shown in FIG. 1), a second three-dimensional model is obtained by repairing a pixel in the area to be repaired according to the color value and the depth value of a pixel in the target area.

Figure 7:
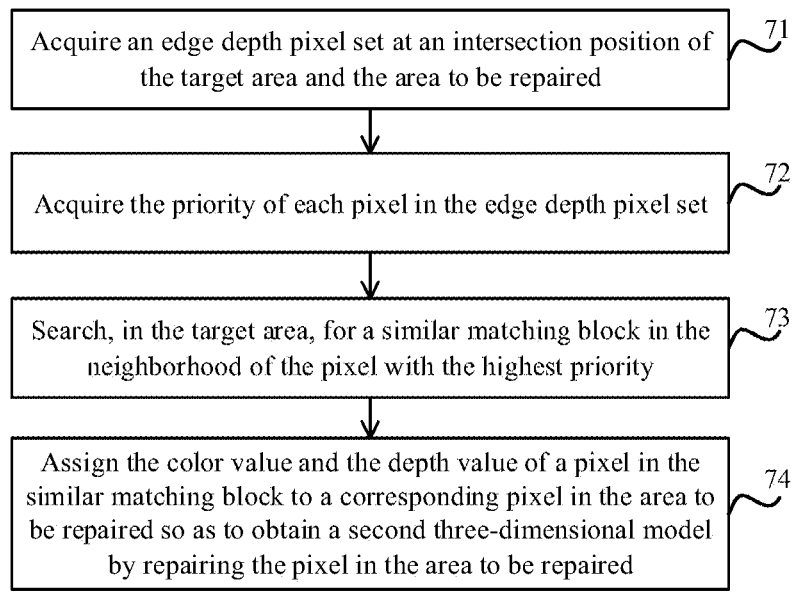
FIG. 7 shows a flow chart for acquiring a second three-dimensional image according to an example.

In this example, the electronic device may repair the pixel in the area to be repaired. Referring to FIG. 7, steps 71-74 are included. In step 71, the electronic device may acquire an edge depth pixel set at the intersection of the target area and the area to be repaired. The edge depth pixel set is the neighborhood with the preset size of the depth edge. In step 72, the electronic device may acquire the priority of each pixel in the edge depth pixel set. In this step, the method for calculating the pixel priority includes, but is not limited to, considering the texture complexity and dispersion of the pixel neighborhood. Taking the texture complexity as an example, the texture complexity of each pixel neighborhood is calculated. The greater the texture complexity, the higher the priority; otherwise, the lower the priority. The shape of the pixel neighborhood includes, but is not limited to, a square shape, a cross shape and a pattern with cross shape and saltire shape. In step 73, the electronic device may search, in the target area, for a similar matching block in the neighborhood of the pixel with the highest priority. The method for searching for the similar matching block includes at least one of a feature-based matching method, a grayscale-based matching method and a relationship-based matching method. In step 74, the electronic device may assign the color value and the depth value of a pixel in the similar matching block to a corresponding pixel in the area to be repaired so as to obtain a second three-dimensional model by repairing the pixel in the area to be repaired.

Figure 8:
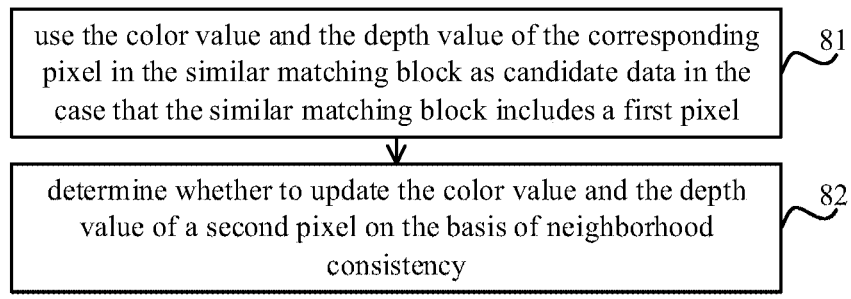
FIG. 8 shows a flow chart for updating the color value and the depth value of a second pixel according to an example.

As the image repairing progresses, the color values and the depth values of known pixels in the neighborhood in step 73 may be obtained from the previous repairing iteration, and these pixels with the repaired color values and depth values are subsequently regarded as the first pixels. In this example, referring to FIG. 8, in step 81, the electronic device may determine whether the similar matching block includes a first pixel, and in the case that the similar matching block includes a first pixel, the color value and the depth value of the corresponding pixel in the similar matching block are used as candidate data. In step 82, the electronic device may determine, on the basis of neighborhood consistency, whether to update the color value and the depth value of a second pixel. The second pixel refers to a neighborhood point with neighborhood integrity in the most similar matching block. In this step, the neighborhood consistency may be used to calculate the variance of the feature values (color value and depth value) in the neighborhood, and the variance represents the degree of dispersion of the feature values in the neighborhood. The smaller the degree of dispersion, the more concentrated the value distribution in the neighborhood; and the greater the degree of dispersion, the more discrete the value distribution in the neighborhood. In the case that the variance is larger (exceeding the variance threshold), it is determined to update the color value and the depth value of the first pixel. In this way, in this example, the solution for repairing pixels by means of neighborhood consistency determination may increase the robustness of the solution of the disclosure.

Referring to FIG. 1, in step 14, a stereoscopic image to be displayed is acquired according to a preset viewing angle change path and the second three-dimensional model.

Figure 9:
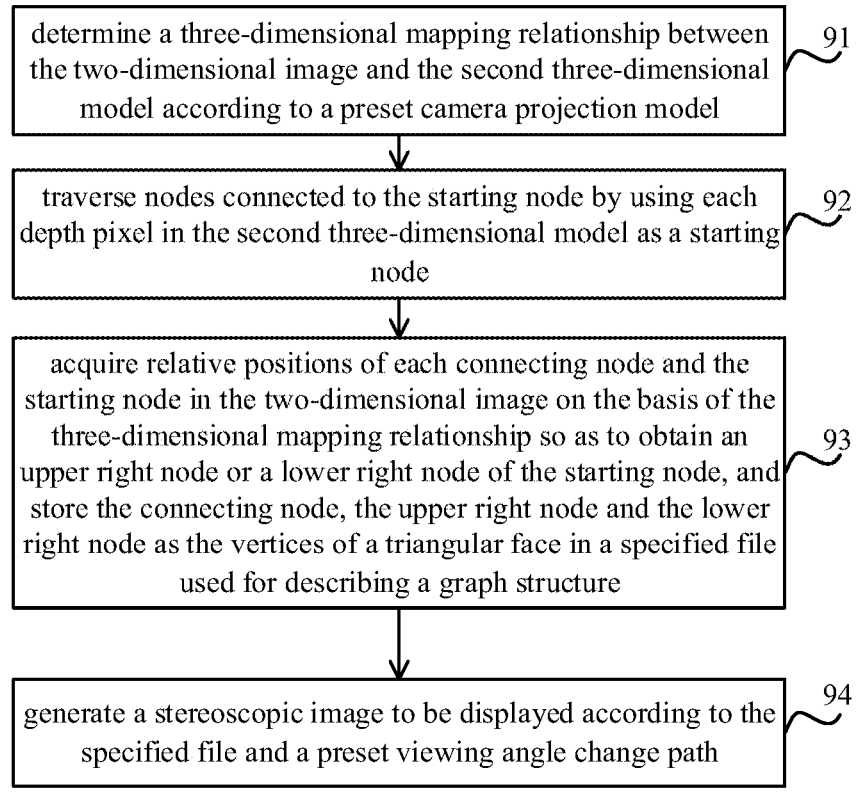
FIG. 9 shows a flow chart for acquiring a stereoscopic image according to an example.

In this example, the electronic device may acquire the stereoscopic image on the basis of the second three-dimensional model. Referring to FIG. 9, steps 91-94 are included.

In step 91, the electronic device may determine a three-dimensional mapping relationship between the two-dimensional image and the second three-dimensional model according to a preset camera projection model. The camera projection model may be acquired from calibration data stored in the electronic device. In addition, in the case that the two-dimensional image, the second three-dimensional model and the camera projection model are all known, a related technique may be used to determine the three-dimensional mapping relationship between the two.

In step 92, the electronic device may traverse nodes connected to the starting node by using each depth pixel in the second three-dimensional model as a starting node.

In step 93, the electronic device may acquire relative positions of each connecting node and the starting node in the two-dimensional image on the basis of the three-dimensional mapping relationship so as to obtain an upper right node or a lower right node of the starting node, and store the starting node, the upper right node and the lower right node as the vertices of a triangular face in a specified file used for describing a graph structure. The specified file used for describing the graph structure may be a PLY (polygon) file. The format of the PLY file is a set of three-dimensional mesh model data formats. As a polygon model data format, it is only used to describe a polygon model object. The model object may be described by means of data such as vertices and faces.

In step 94, the electronic device may generate a stereoscopic image to be displayed according to the specified file and a preset viewing angle change path. In this example, a viewing angle change path option may be set in the electronic device, and a user may trigger to operate this option. The viewing angle change path may include, but is not limited to: front-back change, left-right change, up-down change, clockwise change and counterclockwise change, etc., which can be set according to specific scenes. In other words, the electronic device may read pixel data from the specified file according to the viewing angle change path, and render the effect of the stereoscopic image.

Thus far, in the solutions provided in the examples of the disclosure, by acquiring a target area and an area to be repaired, a color value and a depth value of a pixel in the target area can be used to repair a pixel in the area to be repaired, that is, the pixel modification step can be completed by software and hardware resources in an electronic device, and can be adapted to an electronic device whose hardware and software resources meet the requirements. In other words, in the case of an electronic device whose hardware and software resources meet the requirements, the above solutions can be used to acquire a same stereoscopic image with good portability.

FIG. 2 is flowchart of an example process for implementing a method of the disclosure using one or more processors configured to perform the process steps.

At 2111 a two dimensional image and a depth map acquired by a binocular portrait camera are provided. At 2112 image down-sampling is performed. At 2115, depth map preprocessing is performed. Depth map preprocessing 2115 can include a step 2112 of depth domain conversion, followed by a step 2114 of edge sharpening. At 2117 image expansion is performed around a pixel in an image that has undergone depth map preprocessing at 2115

At 2130 occlusion area information repairing is performed. Occlusion area information repairing 2130 can include: generating at 2118 a mask for a target area; generating at 2119 a mask for an area to be repaired; and repairing information at 2129. Information repairing 2129 can include: determining at 2120 an edge pixel set; calculating at 2121 a priority of a pixel in the edge pixel set; at 2122 searching in the target area for a matching block of a pixel point with a highest priority; at 2123 using the matching block in the target area to repair/update information of the pixel in the area to be repaired.

At 2125 a decision is made as to whether repairing of the area to be repaired is completed. In case the repairing is not completed, the edge pixel set is updated at 2124 and step 2124 is performed in a next iteration based at least in part on the updated edge pixel set. In case the repairing is completed, a decision as to whether to output a final three-dimensional model is made at 2126. In case a final three-dimensional model is to be output at 2126, a triangle face for the three-dimensional model is generated at 2127 and at 2128 a second three-dimensional model in a PLY format is provided at an output.

In case a final three-dimensional model is not to be output, at step of depth layering can be performed at 2131. At 2132 mesh initialization is performed based on Layered Depth Images (LDI). At 2133 a node is generated. At 2150 depth edge aggregation can be performed. Depth edge aggregation 2150 can include: at 2141 selecting a node with connection degree less than a given number, e.g., 4; at 2142 searching through an octa-connectivity (8 connectivity) domain for a depth edge; at 2143 marking a depth level between adjacent nodes; at 2144 connectivity domain analysis is performed; and at 2145 uniqueness detection of node attributes is performed.

In some examples at 2134, a step of removing an islanding value is performed based at least in part on the depth edge aggregation step, and a state is updated at 2135. Depth edge aggregation can be performed based at least in part based on the results of the state updating at 2135.

In some examples, at 2136 a step of inpainting a missing node is performed based at least in part on depth edge aggregation performed at 2150, and depth edge aggregation 2150 can be performed based at least in part on the inpainted missing node at 2136. In some examples a step of edge endpoint connection is performed at 2137 based on depth edge aggregation 2150 and a processing state is updated at 2138. Depth edge aggregation 2150 can then be performed, e.g., in an iteration based at least in part on the updated state at 2136.

In some examples depth edge reduction can be performed at 2139 based on depth edge aggregation 2150 and a state is updated at 2140. Depth edge aggregation 2150 can be performed, e.g., in an iteration based at least in part on the updated state.

Depth edge aggregation step 2150 can be followed by a step of determining background texture and occlusion area at 2160. Background texture and occlusion area determination can include: selecting at 2151 a depth edge that belongs to the background; edge crossing detection at 2152; performing a flood fill algorithm at 2153; extracting at 2155 a near neighborhood of the edge (detected at 2152); and outputting at 2156 occlusion area detection results.

Figure 10:
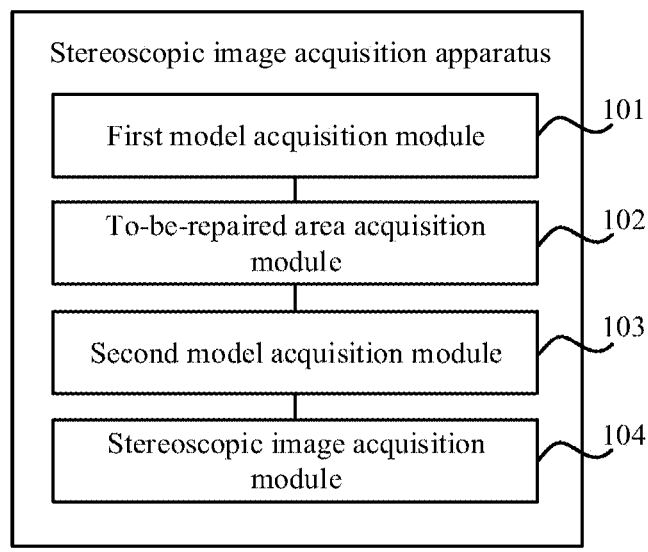
FIG. 10 shows a block diagram of a stereoscopic image acquisition apparatus according to an example.

FIG. 10 shows a block diagram of a stereoscopic image acquisition apparatus according to an example. Referring to FIG. 10, a stereoscopic image acquisition apparatus includes:

a first model acquisition module 101, configured to acquire a first three-dimensional model corresponding to a two-dimensional image according to the two-dimensional image and a depth image;

a to-be-repaired area acquisition module 102, configured to acquire a target area and an area to be repaired corresponding to the first three-dimensional model, the area to be repaired referring to an area that is occluded by a foreground object and needs to be displayed in the case that a viewing angle is changed, and the target area referring to an area that provides a color value and a depth value for the area to be repaired;

a second model acquisition module 103, configured to obtain a second three-dimensional model by repairing a pixel in the area to be repaired according to the color value and the depth value of a pixel in the target area; and a stereoscopic image acquisition module 104, configured to acquire a stereoscopic image to be displayed according to a preset viewing angle change path and the second three-dimensional model.

In an example, the first model acquisition module includes:

a down-sampling unit, configured to down-sample the two-dimensional image and the depth image to obtain a first two-dimensional image and a first depth image;

a first image acquisition unit, configured to preprocess the first depth image to obtain a preprocessed first depth image;

a second image acquisition unit, configured to expand the first two-dimensional image and the preprocessed first depth image to obtain a second two-dimensional image and a second depth image;

a depth pixel acquisition unit, configured to acquire, on the basis of a mapping relationship between the second two-dimensional image and the second depth image, a depth value of each pixel in the second two-dimensional image to obtain a depth pixel corresponding to each pixel; and a first model acquisition unit, configured to connect each depth pixel in sequence to obtain a fully connected undirected graph, and use the undirected graph as the first three-dimensional model.

In an example, the to-be-repaired area acquisition module includes:

a sub-graph acquisition unit, configured to acquire a plurality of sub-graphs corresponding to the first three-dimensional model according to a preset depth threshold, a node of each sub-graph being a depth pixel in the same depth layer;

a depth edge acquisition unit, configured to acquire a plurality of depth edges corresponding to the first three-dimensional model according to the plurality of sub-graphs, the plurality of depth edges including a background depth edge, and the background depth edge referring to a depth edge in which each depth pixel belongs to a background; and a to-be-repaired area acquisition unit, configured to perform iterative expansion around a starting point pixel by using each depth pixel in the background depth edge as the starting point pixel. In the case that the position of an expanded pixel is in the same depth layer as a corresponding starting point pixel, it is determined that the expanded pixel belongs to a texture area; and in the case that the position of the expanded pixel is not in the same depth layer as the corresponding starting point pixel, it is determined that the expanded pixel belongs to an occlusion area. The texture area is used as the target area corresponding to the first three-dimensional model, and the occlusion area is used as the area to be repaired corresponding to the first three-dimensional model.

In an example, the depth edge acquisition unit includes:
a node degree acquisition subunit, configured to acquire, for each sub-graph in the plurality of sub-graphs, a degree of each node in each sub-graph, the degree referring to the number of connecting edges between the node and other nodes, and there being one connecting edge between the node and a node in the same depth layer, and each node in each sub-graph being a depth pixel corresponding to each node in the first three-dimensional model;

a node aggregation acquisition subunit, configured to obtain a plurality of depth edge node aggregations on the basis of a node having an octa-connectivity domain direction aggregation degree less than a preset degree value, the depth edge node aggregation referring to a set of depth pixels located at the edge of the same depth layer; and a depth edge acquisition subunit, configured to perform uniqueness detection on a node in each depth edge node aggregation to determine whether each node belongs to a background pixel or a foreground pixel, and obtaining a plurality of depth edges corresponding to the first three-dimensional model.

In an example, the depth edge acquisition unit includes:
a sub-graph acquisition subunit, configured to acquire at least one closed depth edge to be processed among the plurality of depth edges;

a length acquisition subunit, configured to acquire the length of each depth edge in the neighborhood of each depth edge to be processed, to obtain the longest depth edge corresponding to each depth edge to be processed; and a sub-graph combining subunit, configured to combine each depth edge to be processed into the depth layer of the corresponding longest depth edge.

In an example, the depth edge acquisition unit includes:
a node comparison subunit, configured to compare each pixel in the two-dimensional image with each node in the first three-dimensional model; and a node inpainting subunit, configured to inpaint a missing node in the first three-dimensional model in the case that the missing node corresponding to each pixel in the down-sampled two-dimensional image in the first three-dimensional model is determined, a depth value of the missing node being an average depth value of depth pixels in the longest depth edge nearby.

In an example, the depth edge acquisition unit includes:
an end point acquisition subunit, configured to acquire an end point of each depth edge; and an end point determination subunit, configured to determine the end point to be the end point of the corresponding depth edge in the case that the end point has only one connecting edge and its neighborhood includes at least one end point of the depth edge of another depth layer; and connect the end point to the other depth edge closest to it in the case that the end point has only one connecting edge and its neighborhood does not include an end point of the depth edge of another depth layer.

In an example, the depth edge acquisition unit includes:
a pixel number acquisition subunit, configured to acquire the number of depth pixels contained in each depth edge; and a depth edge deletion subunit, configured to delete the depth edge in the case that the number is less than a preset pixel threshold.

In an example, the second model acquisition module includes:
a pixel set acquisition unit, configured to acquire an edge depth pixel set at an intersection position of the target area and the area to be repaired;

a priority acquisition unit, configured to acquire the priority of each pixel in the edge depth pixel set;

a matching block search unit, configured to search, in the target area, for a similar matching block in the neighborhood of the pixel with the highest priority; and a second model acquisition unit, configured to assign the color value and the depth value of a pixel in the similar matching block to a corresponding pixel in the area to be repaired so as to obtain a second three-dimensional model by repairing the pixel in the area to be repaired.

In an example, the method for searching for the similar matching block includes at least one of a feature-based matching method, a grayscale-based matching method and a relationship-based matching method.

In an example, the second model acquisition module includes:
a candidate data acquisition unit, configured to use the color value and the depth value of the corresponding pixel in the similar matching block as candidate data in the case that the similar matching block includes a first pixel, the first pixel referring to a pixel whose color value and depth value have been repaired; and a first pixel update unit, configured to determine whether to update the color value and the depth value of a second pixel on the basis of neighborhood consistency, the second pixel referring to a neighborhood point with neighborhood integrity in the most similar matching block.

In an example, the stereoscopic image acquisition module includes:

a relationship acquisition unit, configured to determine a three-dimensional mapping relationship between the two-dimensional image and the second three-dimensional model according to a preset camera projection model;

a node traversing unit, configured to traverse nodes connected to the starting node by using each depth pixel in the second three-dimensional model as a starting node;

a vertex acquisition unit, configured to acquire relative positions of each connecting node and the starting node in the two-dimensional image on the basis of the three-dimensional mapping relationship so as to obtain an upper right node or a lower right node of the starting node, and store the connecting node, the upper right node and the lower right node as the vertices of a triangular face in a specified file used for describing a graph structure; and an image generation unit, configured to generate a stereoscopic image to be displayed according to the specified file and a preset viewing angle change path.

It should be understood that the apparatus provided in the example of the disclosure corresponds to the method shown above in FIG. 1, and for the specific content, reference may be made to the content of the method examples, which will not be repeated herein.

Figure 11:
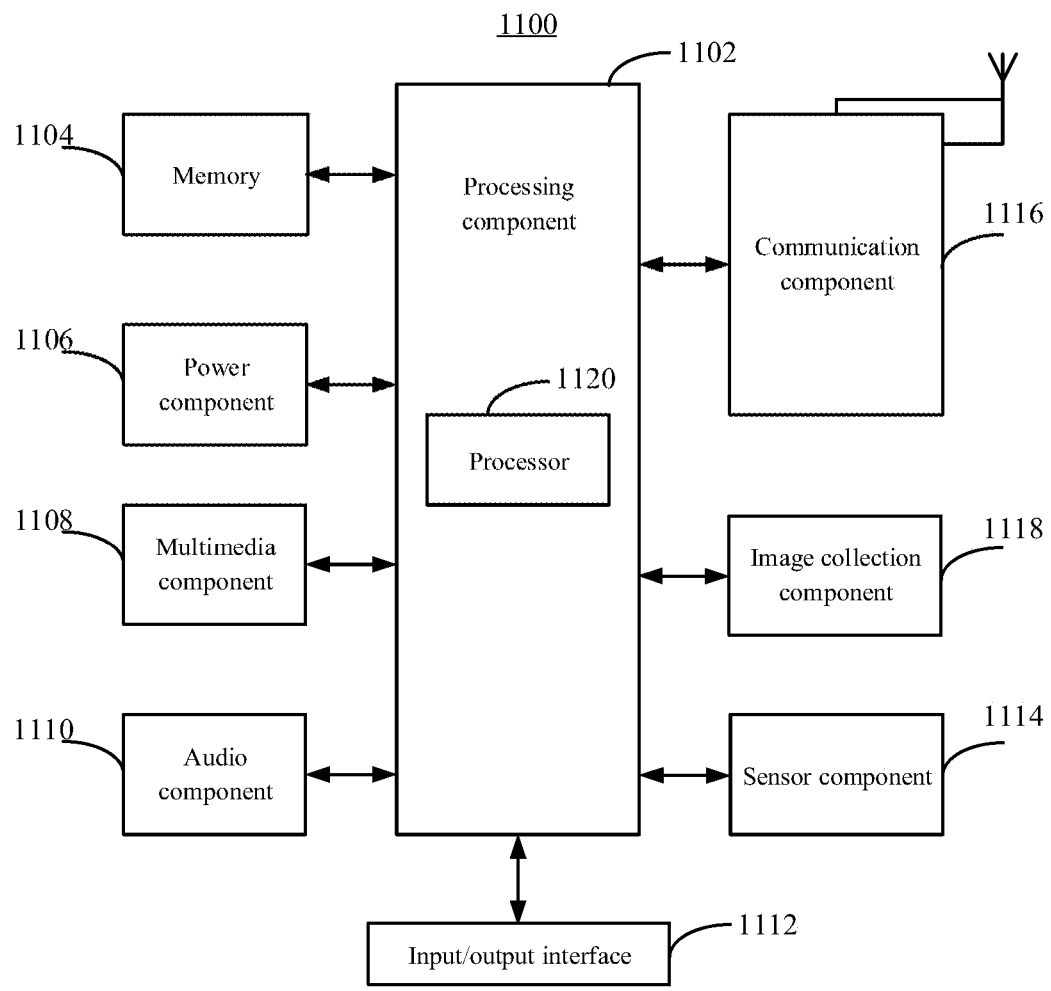
FIG. 11 shows a block diagram of an electronic device according to an example.
Figure 2:
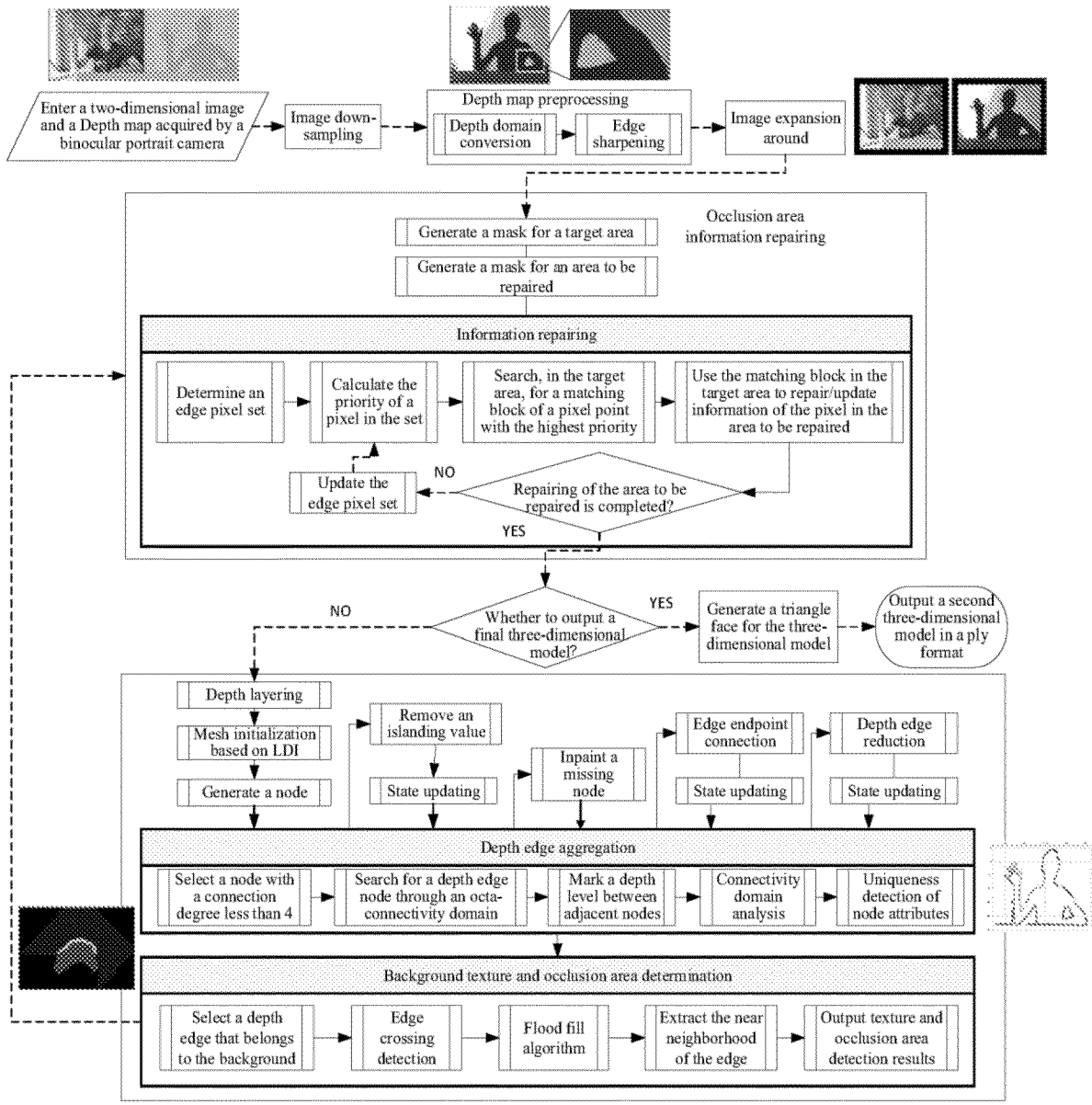
Figure 3:
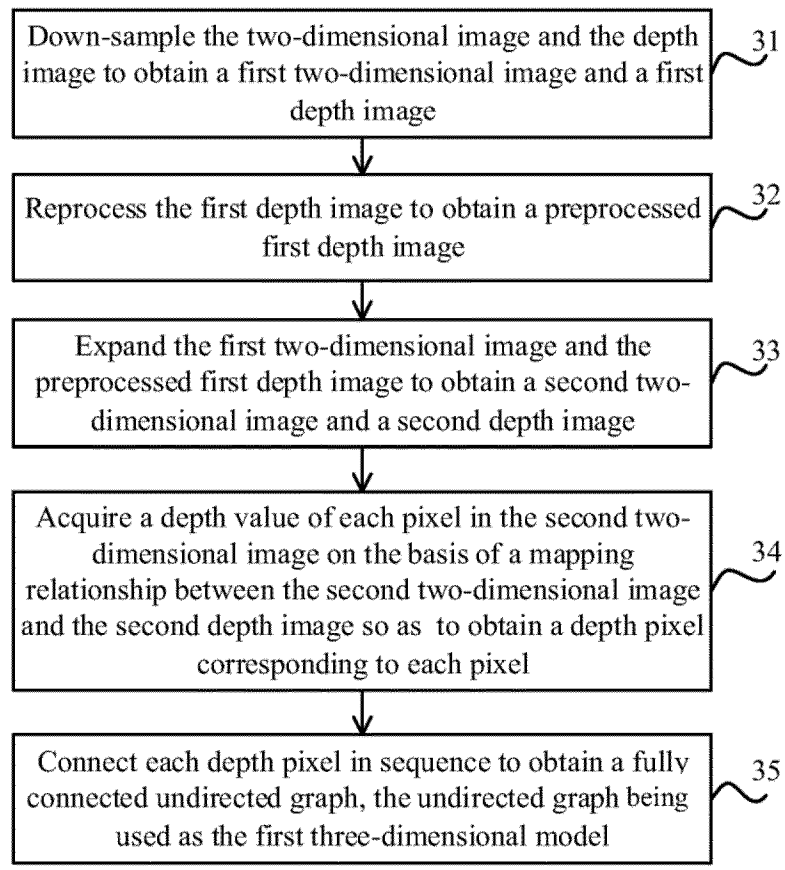
Figure 4:
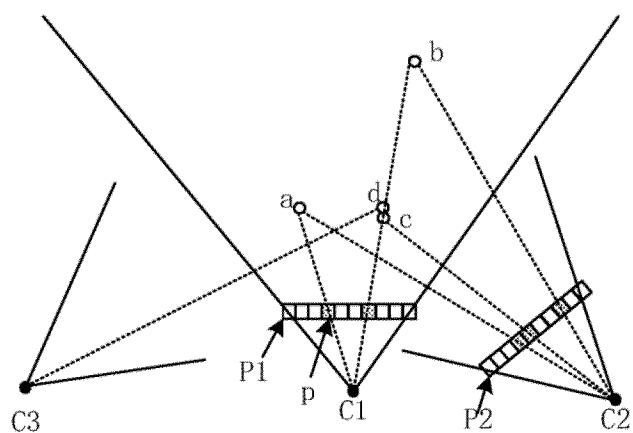
Figure 7:
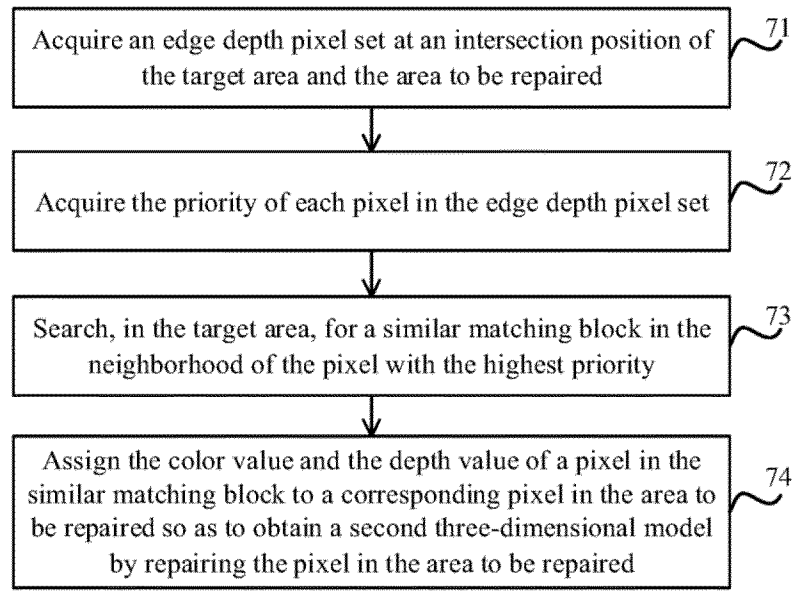
Figure 8:
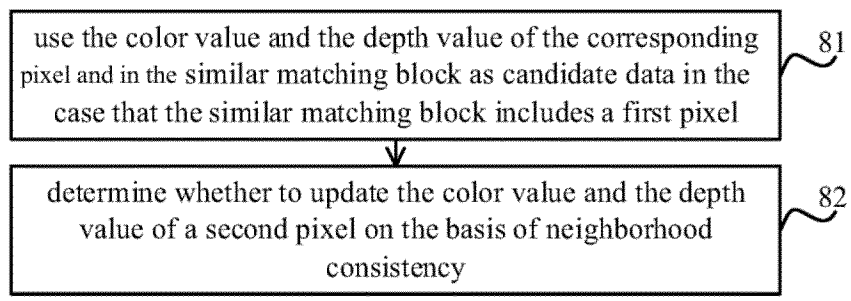

FIG. 11 is a block diagram illustrating an electronic device, according to one example. For example, an electronic device 1100 may be a smart phone, a computer, a digital broadcast terminal, a tablet device, a medical device, a fitness device, a personal digital assistant, etc.

Referring to FIG. 11, the electronic device 1100 may include one or more of the following components: a processing component 1102, a memory 1104, a power component 1106, a multimedia component 1108, an audio component 1110, an Input/Output (I/O) interface 1112, a sensor component 1114, a communication component 1116, and an image collection component 1118.

The processing component 1102 typically controls overall operations of the electronic device 1100, such as operations associated with display, telephone calls, data communications, camera operations, and recording operations. The processing component 1102 may include one or more processors 1120 to execute computer programs. In addition, the processing component 1102 may include one or more modules to facilitate the interaction between the processing component 1102 and other components. For example, the processing component 1102 may include a multimedia module to facilitate interaction between the multimedia component 1108 and the processing component 1102.

The memory 1104 is configured to store various types of data to support the operation of the electronic device 1100. Examples of such data include computer programs comprising instructions for any applications or methods carried out on the electronic device 1100, contact data, phonebook data, messages, pictures, video, etc. The memory 1104 may be implemented by any type of volatile or non-volatile storage devices or a combination of them, such as Static Random Access Memory (SRAM), an Electrically Erasable Programmable Read-Only Memory (EEPROM), a Programming Read-Only Memory (EPROM), a Programmable Read-Only Memory (PROM), a Read-Only Memory (ROM), a magnetic memory, a flash memory, a magnetic disk or an optical disk.

The power component 1106 provides power to various components of the electronic device 1100. The power component 1106 may include a power management system, one or more power sources, and any other components associated with the generation, management and distribution of power in the electronic device 1100. The power component 1106 may include a power chip, and a controller may communicate with the power chip to control the power chip to connect or disconnect a switching device so that a battery is powered or not powered to a motherboard circuit.

The multimedia component 1108 includes a screen providing an output interface between the electronic device 1100 and the object. In some examples, the screen may include a liquid crystal display (LCD) and a touch panel (TP). If the screen includes the touch panel, the screen may be implemented as a touch screen to receive an input signal from an object. The touch panel includes one or more touch sensors to sense touch, swipe, and gestures on the touch panel. The touch sensor may not only sense a boundary of a touch or swipe action, but also detect duration and pressure related to the touch or swipe operation.

The audio component 1110 is configured to output and/or input audio signals. For example, the audio component 1110 includes a Microphone (MIC) configured to receive an external audio signal when the electronic device 1100 is in an operation mode, such as a call mode, a recording mode, and a voice recognition mode. The received audio signals may be further stored in the memory 1104 or transmitted via the communication component 1116. In some examples, the audio component 1110 may further include a speaker to output audio signals.

The I/O interface 1112 provides an interface between the processing component 1102 and a peripheral interface module. The peripheral interface module may be a keyboard, a click wheel, a button, and the like.

The sensor component 1114 includes one or more sensors to provide status assessments of various aspects of the electronic device 1100. For example, the sensor component 1114 may detect an open/closed status of the electronic device 1100, and relative positioning of components. For example, the component is the display and the keypad of the electronic device 1100. The sensor component 1114 may also detect a change in position of the electronic device 1100 or a component, presence or absence of object contact with the electronic device 1100, an orientation or an acceleration/deceleration of the electronic device 1100, and a change in temperature of the electronic device 1100. In the example, the sensor component 1114 may include a magnetic sensor, a gyroscope, and a magnetic field sensor, and the magnetic field sensor includes at least one of the following: a Hall sensor, a thin film magneto-resistive sensor, and a magnetic liquid acceleration sensor.

The communication component 1116 is configured to facilitate communication, in wired or wireless means, between the electronic device 1100 and other devices. The electronic device 1100 may access a wireless network based on a communication standard, such as WiFi, 2G, 3G, 4G or 5G, or a combination of them. In one example, the communication component 1116 receives broadcast signals or broadcast related information from an external broadcast management system via a broadcast channel. In one example, the communication component 1116 further includes a Near-Field Communication (NFC) module to facilitate short-range communications. For example, the NFC module may be implemented based on a Radio Frequency Identification (RFID) technology, an Infrared Data Association (IrDA) technology, an Ultra-Wide Band (UWB) technology, a Bluetooth (BT) technology and other technologies.

In some examples, the electronic device 1100 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic elements. In an example, the processor includes a digital signal processor (DSP); the DSP is utilized to perform parallel processing on pixels of a same fuzzy kernel radius in a same row of pixels within the fuzzy kernel shape to achieve single instruction multiple data stream processing.

In some examples, there is also provided a non-transitory computer readable storage medium including an executable computer program, such as a memory 1104 including instructions, the executable computer program being executable by a processor. The computer-readable storage medium may be a ROM, Random Access Memory (RAM), a Compact Disc Read-Only Memory (CD-ROM), a magnetic tape, a floppy disk, an optical data storage device, and the like.

Other examples within the scope of the disclosure will be apparent to those skilled in the art from consideration of the specification and practice of the technical solution disclosed here. The disclosure is intended to cover any variations, uses, or adaptive changes to the examples of the disclosure. These variations, uses, or adaptive changes follow the general principles of the disclosure and include common general knowledge or conventional technical means in the technical field, which are not disclosed herein. The description and the examples are considered as being exemplary only, with a true scope and spirit of the disclosure being indicated by the following claims.

It should be understood that the disclosure is not limited to the exact construction that has been described above and illustrated in the accompanying drawings, and that various modifications and changes can be made without departing from the scope of the present application.

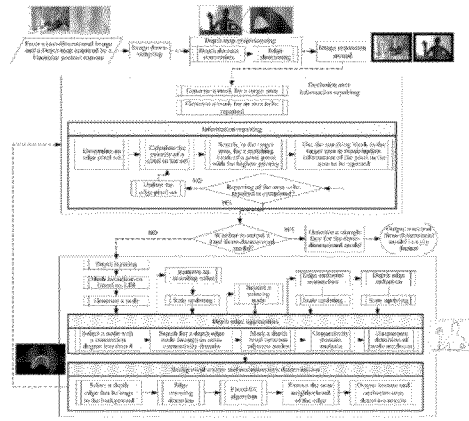

What is claimed is:

1. A stereoscopic image acquisition method, comprising:
acquiring a first three-dimensional model corresponding to a two-dimensional image according to the two-dimensional image and a depth image;
acquiring a target area and an area to be repaired corresponding to the first three-dimensional model, wherein the area to be repaired refers to an area occluded by a foreground object and to be displayed in the case of a viewing angle being changed, and wherein the target area refers to an area providing a color value and a depth value for the area to be repaired;
obtaining a second three-dimensional model by repairing a pixel in the area to be repaired according to the color value and the depth value of a pixel in the target area; and
acquiring a stereoscopic image to be displayed according to a preset viewing angle change path and the second three-dimensional model;
wherein acquiring the target area and the area to be repaired corresponding to the first three-dimensional model comprises:
acquiring a plurality of sub-graphs corresponding to the first three-dimensional model according to a preset depth threshold, wherein a node of each sub-graph is a depth pixel in a same depth layer;
acquiring a plurality of depth edges corresponding to the first three-dimensional model according to the plurality of sub-graphs, wherein the plurality of depth edges comprise a background depth edge, and the background depth edge refers to a depth edge in which each depth pixel belongs to a background;
performing iterative expansion around a starting point pixel by using each depth pixel in the background depth edge as the starting point pixel, wherein an expanded pixel belongs to a texture area in the case of a position of the expanded pixel being in the same depth layer as a corresponding starting point pixel, and the expanded pixel belongs to an occlusion area in the case of the position of the expanded pixel being not in the same depth layer as the corresponding starting point pixel; and
using the texture area as the target area corresponding to the first three-dimensional model, and using the occlusion area as the area to be repaired corresponding to the first three-dimensional model.

2. The method according to claim 1, wherein acquiring the first three-dimensional model corresponding to the two-dimensional image according to the two-dimensional image and the depth image comprises:
down-sampling the two-dimensional image and the depth image to obtain a first two-dimensional image and the first depth image;
preprocessing the first depth image to obtain a preprocessed first depth image;
expanding the first two-dimensional image and the preprocessed first depth image to obtain a second two-dimensional image and a second depth image;
on the basis of a mapping relationship between the second two-dimensional image and the second depth image, acquiring a depth value of each pixel in the second two-dimensional image to obtain a depth pixel corresponding to each pixel; and
connecting each depth pixel in sequence to obtain a fully connected undirected graph, and using the undirected graph as the first three-dimensional model.

3. The method according to claim 1, wherein acquiring the plurality of depth edges corresponding to the first three-dimensional model according to the plurality of sub-graphs comprises:
acquiring a degree of each node in each sub-graph of the plurality of sub-graphs, wherein the degree refers to the number of connecting edges between the node and other nodes, and one connecting edge is formed between the node and a node in the same depth layer, and each node in each sub-graph is a depth pixel corresponding to each node in the first three-dimensional model;
obtaining a plurality of depth edge node aggregations based on a node having an octa-connectivity domain direction aggregation degree less than a preset degree value, wherein the depth edge node aggregation refers to a set of depth pixels located at the edge of the same depth layer; and
performing uniqueness detection on a node in each depth edge node aggregation to determine each node belongs to a background pixel or a foreground pixel, and obtaining a plurality of depth edges corresponding to the first three-dimensional model.

4. The method according to claim 1, wherein the method comprises:
acquiring at least one closed depth edge to be processed among the plurality of depth edges;
acquiring the length of each depth edge in the neighborhood of each depth edge to be processed, to obtain the longest depth edge corresponding to each depth edge to be processed; and
combining each depth edge to be processed into the depth layer of the corresponding longest depth edge.

5. The method according to claim 4, wherein after combining each depth edge to be processed into the depth layer of the corresponding longest depth edge, the method comprises:
comparing each pixel in the two-dimensional image with each node in the first three-dimensional model; and
inpainting a missing node in the first three-dimensional model in the case of the missing node corresponding to each pixel in the down-sampled two-dimensional image in the first three-dimensional model being determined, wherein a depth value of the missing node is an average depth value of depth pixels in the longest depth edge nearby.

6. The method according to claim 4, wherein the method comprises:
acquiring an end point of each depth edge; and
determining the end point to be the end point of the corresponding depth edge in the case of the end point having only one connecting edge and a neighborhood of the end point comprising at least one end point of the depth edge of another depth layer; and connecting the end point to the other depth edge closest to it in the case of the end point having only one connecting edge and the neighborhood of the end point does not comprise an end point of the depth edge of another depth layer.

7. The method according to claim 4, wherein the method comprises:
acquiring a number of depth pixels contained in each depth edge; and
deleting the depth edge in the case of the number being less than a preset pixel threshold.

8. The method according to claim 1, wherein obtaining a second three-dimensional model by repairing a pixel in the area to be repaired according to the color value and the depth value of a pixel in the target area comprises:
acquiring an edge depth pixel set at an intersection position of the target area and the area to be repaired;
acquiring a priority of each pixel in the edge depth pixel set;
searching, in the target area, for a similar matching block in the neighborhood of a pixel with the highest priority; and
assigning the color value and the depth value of a pixel in the similar matching block to a corresponding pixel in the area to be repaired so as to obtain a second three-dimensional model by repairing a pixel in the area to be repaired.

9. The method according to claim 8, wherein the method for searching for the similar matching block comprises at least one of a feature-based matching method, a grayscale-based matching method and a relationship-based matching method.

10. The method according to claim 8, wherein before assigning the color value and the depth value of a pixel in the similar matching block to a corresponding pixel in the area to be repaired so as to obtain a second three-dimensional model by repairing a pixel in the area to be repaired, the method comprises:
using the color value and the depth value of the corresponding pixel in the similar matching block as candidate data in the case of the similar matching block comprising a first pixel, wherein the first pixel refers to a pixel whose color value and depth value have been repaired; and
determining whether to update the color value and the depth value of a second pixel on the basis of neighborhood consistency, wherein the second pixel refers to a neighborhood point with neighborhood integrity in the similar matching block.

11. The method according to claim 1, wherein acquiring the stereoscopic image to be displayed according to the preset viewing angle change path and the second three-dimensional model comprises:
determining a three-dimensional mapping relationship between the two-dimensional image and the second three-dimensional model according to a preset camera projection model;
traversing nodes connected to a starting node by using each depth pixel in the second three-dimensional model as the starting node;
acquiring relative positions of each connecting node and the starting node in the two-dimensional image on the basis of the three-dimensional mapping relationship so as to obtain an upper right node or a lower right node of the starting node, and storing the connecting node, the upper right node and the lower right node as vertices of a triangular face in a specified file used for describing a graph structure; and
generating a stereoscopic image to be displayed according to the specified file and a preset viewing angle change path.

12. An electronic device, comprising:
a processor; and
a memory storing a computer program executable by the processor,
whereby the processor:
acquires a first three-dimensional model corresponding to a two-dimensional image according to the two-dimensional image and a depth image;
acquires a target area and an area to be repaired corresponding to the first three-dimensional model, wherein the area to be repaired refers to an area occluded by a foreground object and the area is to be displayed in the case of a viewing angle being changed, and the target area refers to an area providing a color value and a depth value for the area to be repaired;
obtains a second three-dimensional model by repairing a pixel in the area to be repaired according to the color value and the depth value of a pixel in the target areal; and
acquires a stereoscopic image to be displayed according to a preset viewing angle change path and the second three-dimensional model;
wherein acquiring the target area and the area to be repaired corresponding to the first three-dimensional model comprises:
acquiring a plurality of sub-graphs corresponding to the first three-dimensional model according to a preset depth threshold, wherein a node of each sub-graph is a depth pixel in a same depth layer;

acquiring a plurality of depth edges corresponding to the first three-dimensional model according to the plurality of sub-graphs, wherein the plurality of depth edges comprise a background depth edge, and the background depth edge refers to a depth edge in which each depth pixel belongs to a background;

performing iterative expansion around a starting point pixel by using each depth pixel in the background depth edge as the starting point pixel, wherein an expanded pixel belongs to a texture area in the case of a position of the expanded pixel being in the same depth layer as a corresponding starting point pixel, and the expanded pixel belongs to an occlusion area in the case of the position of the expanded pixel being not in the same depth layer as the corresponding starting point pixel; and using the texture area as the target area corresponding to the first three-dimensional model, and using the occlusion area as the area to be repaired corresponding to the first three-dimensional model.

13. The electronic device according to claim 12, wherein the processor:

down-samples the two-dimensional image and the depth image to obtain a first two-dimensional image and the first depth image;

preprocesses the first depth image to obtain a preprocessed first depth image;

expands the first two-dimensional image and the preprocessed first depth image to obtain a second two-dimensional image and a second depth image;

acquires a depth value of each pixel in the second two-dimensional image on the basis of a mapping relationship between the second two-dimensional image and the second depth image so as to obtain a depth pixel corresponding to each pixel; and connects each depth pixel in sequence to obtain a fully connected undirected graph, wherein the undirected graph is used as the first three-dimensional model.

14. The electronic device according to claim 12, wherein the processor:

acquires a degree of each node in each sub-graph of the plurality of sub-graphs, wherein the degree refers to a number of connecting edges between the node and other nodes, and one connecting edge between the node and a node in the same depth layer, and each node in each sub-graph is a depth pixel corresponding to each node in the first three-dimensional model;

obtains a plurality of depth edge node aggregations based on a node having an octa-connectivity domain direction aggregation degree less than a preset degree value, wherein the depth edge node aggregation refers to a set of depth pixels located at the edge of the same depth layer; and performs uniqueness detection on a node in each depth edge node aggregation to determine each node belongs to a background pixel or a foreground pixel, and obtains a plurality of depth edges corresponding to the first three-dimensional model.

15. The electronic device according to claim 12, wherein the processor:

acquires at least one closed depth edge to be processed among the plurality of depth edges;

acquires a length of each depth edge in the neighborhood of each depth edge to be processed, to obtain a longest depth edge corresponding to each depth edge to be processed; and combines each depth edge to be processed into the depth layer of the corresponding longest depth edge.

16. The electronic device according to claim 12, wherein the processor:

acquires an edge depth pixel set at an intersection position of the target area and the area to be repaired;

acquires a priority of each pixel in the edge depth pixel set;

searches, in the target area, for a similar matching block in the neighborhood of a pixel with the highest priority; and assigns the color value and the depth value of a pixel in the similar matching block to a corresponding pixel in the area to be repaired so as to obtain a second three-dimensional model by repairing the pixel in the area to be repaired.

17. The electronic device according to claim 12, wherein the processor:

determines a three-dimensional mapping relationship between the two-dimensional image and the second three-dimensional model according to a preset camera projection model;

traverses nodes connected to the starting node by using each depth pixel in the second three-dimensional model as a starting node;

acquires relative positions of each connecting node and the starting node in the two-dimensional image on the basis of the three-dimensional mapping relationship so as to obtain an upper right node or a lower right node of the starting node, and store the connecting node, the upper right node and the lower right node as vertices of a triangular face in a specified file used for describing a graph structure; and generates a stereoscopic image to be displayed according to the specified file and a preset viewing angle change path.

18. A non-transitory computer-readable storage medium, wherein when an executable computer program in the storage medium is executed by a processor, the processor:

acquires a first three-dimensional model corresponding to a two-dimensional image according to the two-dimensional image and a depth image;

acquires a target area and an area to be repaired corresponding to the first three-dimensional model, wherein the area to be repaired refers to an area occluded by a foreground object and the area is to be displayed in the case of a viewing angle being changed, and the target area refers to an area providing a color value and a depth value for the area to be repaired;

obtains a second three-dimensional model by repairing a pixel in the area to be repaired according to the color value and the depth value of a pixel in the target area; and acquires a stereoscopic image to be displayed according to a preset viewing angle change path and the second three-dimensional model;

wherein acquiring the target area and the area to be repaired corresponding to the first three-dimensional model comprises:

acquiring a plurality of sub-graphs corresponding to the first three-dimensional model according to a preset depth threshold, wherein a node of each sub-graph is a depth pixel in a same depth layer;

acquiring a plurality of depth edges corresponding to the first three-dimensional model according to the plurality of sub-graphs, wherein the plurality of depth edges comprise a background depth edge, and the background depth edge refers to a depth edge in which each depth pixel belongs to a background;

performing iterative expansion around a starting point pixel by using each depth pixel in the background depth edge as the starting point pixel, wherein an expanded pixel belongs to a texture area in the case of a position of the expanded pixel being in the same depth layer as a corresponding starting point pixel, and the expanded pixel belongs to an occlusion area in the case of the position of the expanded pixel being not in the same depth layer as the corresponding starting point pixel; and using the texture area as the target area corresponding to the first three-dimensional model, and using the occlusion area as the area to be repaired corresponding to the first three-dimensional model.

\* \* \* \* \*

UNITED STATES PATENT AND TRADEMARK OFFICE
CERTIFICATE OF CORRECTION

PATENT NO. : 11,908,096 B2
APPLICATION NO. : 17/565746
DATED : February 20, 2024
INVENTOR(S) : Zhang et al.

It is certified that error appears in the above-identified patent and that said Letters Patent is hereby corrected as shown below:

On the Title Page

Delete the title page and substitute therefore with the attached title page consisting of the corrected illustrative figure.

In Item (56), under "OTHER PUBLICATIONS", in Column 2, Line 3, delete "2017, ," and insert -- 2017, --, therefor.
On Page 2, in Item (56), under "OTHER PUBLICATIONS", in Column 2, Line 21, delete "Shih M L," and insert -- Shih ML, --, therefor.

In the Drawings

Please replace drawing sheets 2, 3 and 8 with drawing sheets 2, 3 and 8, consisting of FIGS. 2, 3, 4, 7 and 8 as shown on the attached pages.

In the Specification

In Column 5, Line 25, delete "[0,10]" and insert -- [0, 10] --, therefor.
In Column 6, Line 59, delete "the depth" and insert -- if the depth --, therefor.
In Column 11, Line 38, delete "2115" and insert -- 2115. --, therefor.
In Column 16, Line 3, delete "Programming" and insert -- Erasable Programmable --, therefor.

Signed and Sealed this
Tenth Day of September, 2024

Katherine Kelly Vidal
*Director of the United States Patent and Trademark Office*

(12) United States Patent
Zhang et al.

(10) Patent No.: US 11,908,096 B2
(45) Date of Patent: Feb. 20, 2024

(54) STEREOSCOPIC IMAGE ACQUISITION METHOD, ELECTRONIC DEVICE AND STORAGE MEDIUM

(71) Applicant: Beijing Xiaomi Mobile Software Co., Ltd., Beijing (CN)

(72) Inventors: Yangyang Zhang, Beijing (CN); Zixuan Huang, Beijing (CN); Shuangshuang Yin, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 198 days.

(21) Appl. No.: 17/565,746

(22) Filed: Dec. 30, 2021

(65) Prior Publication Data
US 2022/0351478 A1  Nov. 3, 2022

(30) Foreign Application Priority Data

Apr. 29, 2021 (CN) .......................... 202110473235.2

(51) Int. Cl.
| | |
|---|---|
| *G06T 19/20* | (2011.01) |
| *G06T 15/20* | (2011.01) |
| *G06T 5/00* | (2006.01) |
| *G06T 7/50* | (2017.01) |
| *H04N 13/128* | (2018.01) |

(Continued)

(52) U.S. Cl.
CPC .............. *G06T 19/20* (2013.01); *G06T 5/005* (2013.01); *G06T 7/50* (2017.01); *G06T 15/20* (2013.01); *G06T 7/543* (2017.01); *G06T 17/00* (2013.01); *G06T 2207/10024* (2013.01); *G06T 2207/10028* (2013.01); *G06T 2207/20072* (2013.01);

(Continued)

(58) Field of Classification Search
CPC .......... G06T 19/20; G06T 5/005; G06T 7/50; G06T 15/20; G06T 2207/10024; G06T 2219/2012; G06T 2207/10028; G06T 2207/20072; G06T 17/00; G06T 17/10; G06T 7/543; H04N 13/128; H04N 13/279
See application file for complete search history.

(56) References Cited

U.S. PATENT DOCUMENTS

| | | |
|---|---|---|
| 9,013,482 B2 | 4/2015 | Lim et al. |
| 2007/0237420 A1* | 10/2007 | Steedly .................. G06V 10/24 382/284 |

(Continued)

OTHER PUBLICATIONS

Chen et al., "CN107578389A—The method that the image color depth information collaboration of plane supervision is repaired", 2017, , Sun Yat Sen University (Year: 2017).*

(Continued)

*Primary Examiner* — YuJang Tswei
(74) *Attorney, Agent, or Firm* — Volpe Koenig

(57) ABSTRACT

A stereoscopic image acquisition method includes acquiring a first three-dimensional model corresponding to a two-dimensional image according to the two-dimensional image and a depth image; acquiring a target area and an area to be repaired corresponding to the first three-dimensional model; obtaining a second three-dimensional model by repairing a pixel in the area to be repaired according to a color value and a depth value of a pixel in the target area; and acquiring a stereoscopic image to be displayed according to a preset viewing angle change path and the second three-dimensional model.

18 Claims, 8 Drawing Sheets